United States Patent

Higuchi

[11] Patent Number: 5,875,473
[45] Date of Patent: Feb. 23, 1999

[54] MULTI-PROCESSOR SYSTEM AND METHOD FOR CONTROLLING ACCESS TO A PAGE DESCRIPTOR DURING THE PROCESS OF UPDATING THE PAGE DESCRIPTORS

[75] Inventor: Osamu Higuchi, Tokyo, Japan

[73] Assignee: NEC Corporation, Tokyo, Japan

[21] Appl. No.: 671,012

[22] Filed: Jun. 28, 1996

[30] Foreign Application Priority Data

Jul. 7, 1995 [JP] Japan .................................. 7-196029

[51] Int. Cl.$^6$ ...................................................... G06F 13/18
[52] U.S. Cl. ........................ 711/151; 711/145; 711/150; 711/152; 711/207; 711/208; 711/168
[58] Field of Search ..................................... 711/145, 150, 711/151, 152, 158, 167, 168, 202, 207, 208; 395/732, 287

[56] References Cited

U.S. PATENT DOCUMENTS 5,075,846  12/1991  Reininger et al. ....................... 364/400
5,522,045   5/1996  Sandberg ............................ 395/200.45
5,524,235   6/1996  Larson et al. ............................ 711/151

*Primary Examiner*—Eddie P. Chan
*Assistant Examiner*—T. V. Nguyen
*Attorney, Agent, or Firm*—McGinn & Gibb, P.C.

[57] ABSTRACT

In a multi-processor system, a page descriptor can be updated in a memory coupled to a processor without stopping operations of other processors. Each processor has a page descriptor comparator including a calculated address register which stores a physical page address for an address calculation, and an updated address register which stores a physical page address to be updated. The page descriptor comparator also has a reset page descriptor (RSTPD) mode register which indicates a mode of the processor, and a coincidence detector. If the RSTPD mode register is active, the coincidence detector detects coincidence between the calculated address register and the updated address register.

23 Claims, 6 Drawing Sheets

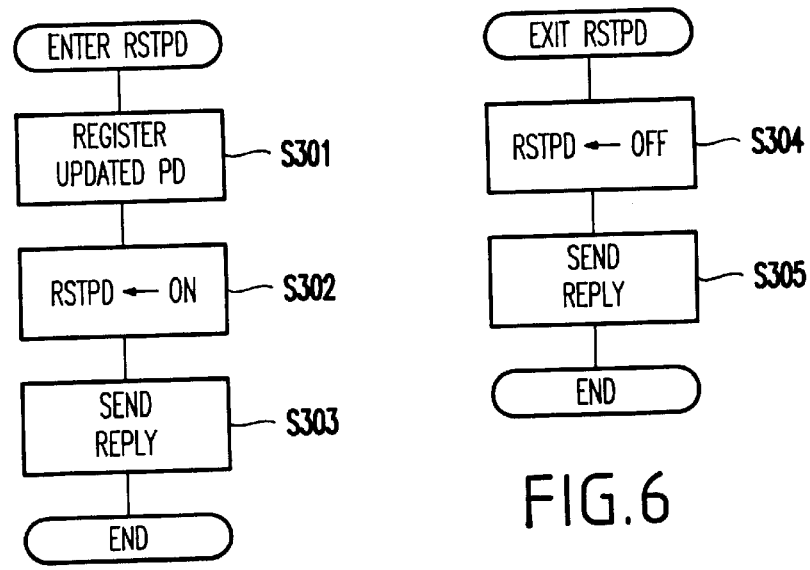
FIG. 5
FIG. 6
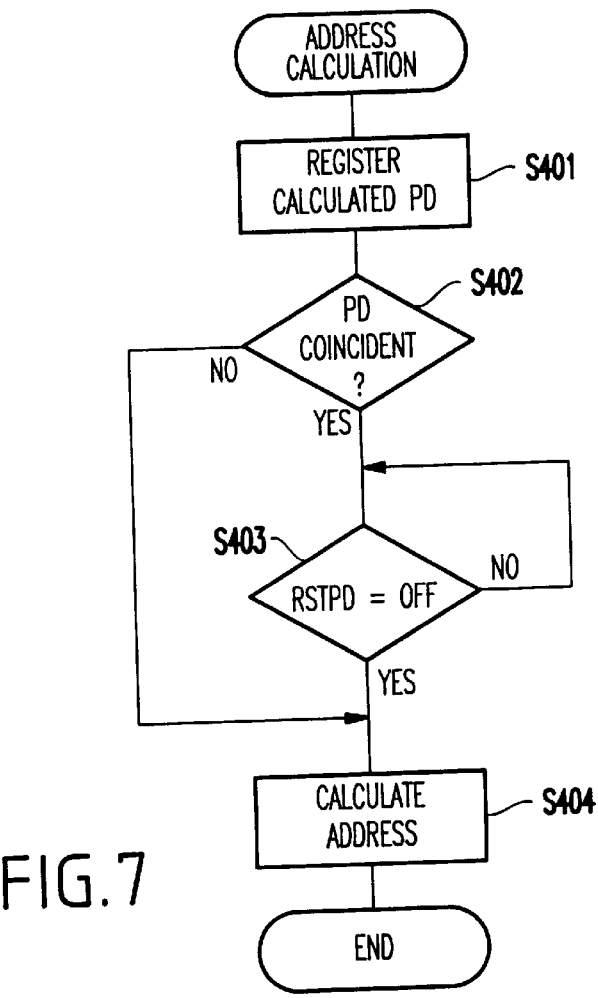
FIG. 7

MULTI-PROCESSOR SYSTEM AND METHOD FOR CONTROLLING ACCESS TO A PAGE DESCRIPTOR DURING THE PROCESS OF UPDATING THE PAGE DESCRIPTORS

BACKGROUND OF THE INVENTION

The present invention relates to a multi-processor system and method for controlling an access to a page descriptor for paging, and more particularly to a multi-processor system and method for controlling an access to a page descriptor which is being reset (e.g., updated).

Paging systems use fixed-length blocks called "pages" and assign the pages to fixed regions of physical memory called "page frames". Referring to FIG. 1, each logical address comprises two parts: a page address and a displacement. The displacement is a relative address in a page. For each logical page address, there is the corresponding physical address of a page frame in main or secondary memory. A page table stores page descriptors specifying pages. Each page descriptor has a physical page address. Each physical address (e.g., effective address) comprises the physical page address and the displacement.

In a conventional multi-processor system with paging, while a page descriptor is updated by a certain processor, an access to the page descriptor by other processors is prohibited. Moreover, during the updating process and prior to performing other processes, the other processors must wait for completion of the updating, for example, by performing a loop of "firmware" instructions.

However, normal operations cannot be performed until the updating operation of the page descriptor is completed, since the other processors are in "waiting" (pause) states. This waiting by the other processors lowers the system performance since the other processors are idle.

SUMMARY OF THE INVENTION

In view of the foregoing problem of the conventional system, an object of the present invention is to provide a multi-processor system in which, while a page descriptor is being updated by a certain processor, other processors may operate without waiting for the completion of updating of the page descriptor.

In a multi-processor system according to a first aspect of the present invention, each of a plurality of processors comprises an address calculator for calculating an effective address; a page descriptor comparator for comparing a first page descriptor with a second page descriptor; and an address calculation pending indicator for instructing the address calculator to stop the address calculation, while the page descriptor comparator detects coincidence between the first page descriptor and the second page descriptor.

With the unique and unobvious structure of the present invention, operations other than accessing an updated page descriptor can be executed by the other processors without waiting.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 5 is a flowchart showing an "ENTER RSTPD" operation of a page descriptor controller 30 according to the first embodiment of the present invention;

FIG. 6 is a flowchart showing an "EXIT RSTPD" operation of the page descriptor controller 30 according to the first embodiment of the present invention;

FIG. 7 is a flowchart showing an address calculation operation of the page descriptor comparator 40 according to the first embodiment of the present invention;

DETAILED DESCRIPTION OF THE PREFERRED EMBODIMENTS

A multi-processor system in accordance with preferred embodiments of the present invention will be described in detail with reference to the accompanying drawings.

Figure 1:
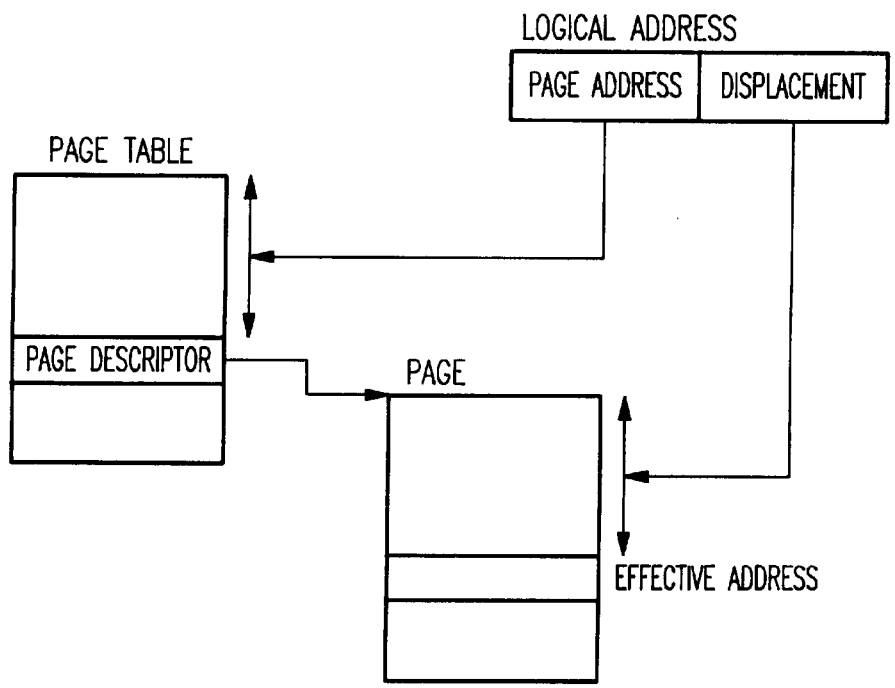
FIG. 1 shows a correspondence between a logical address and a physical address (e.g., an effective address)
Figure 2:
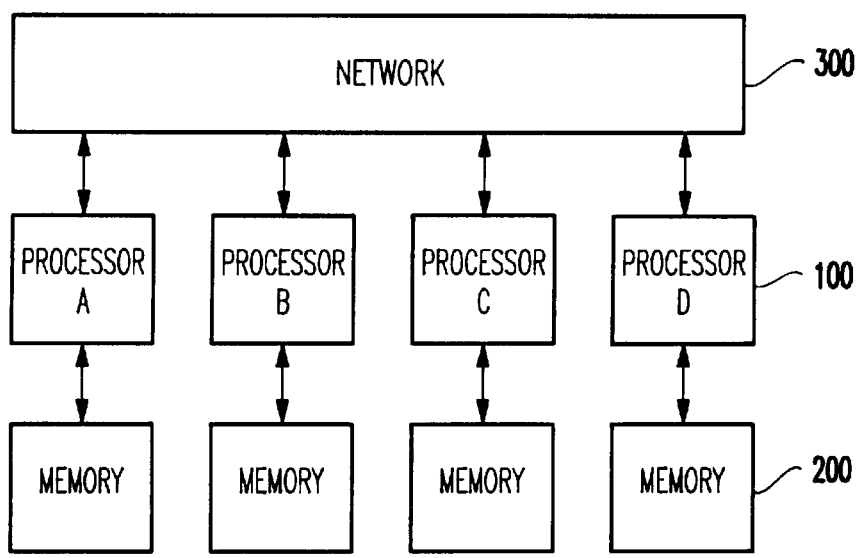
FIG. 2 is a block diagram showing the configuration of a multi-processor system according to a first embodiment of the present invention.

Referring to FIG. 2, a multi-processor system in accordance with a first embodiment of the present invention comprises a plurality (e.g., four) of processors 100, a plurality (e.g., four) of memories 200 each connected to its corresponding processor 100, and a network 300 interconnecting the processors 100.

Each memory 200 stores a page table having page descriptors. Each page descriptor has a physical page address. The page descriptors in the memories 200 are updated by their respective processors 100 coupled thereto.

Figure 3:
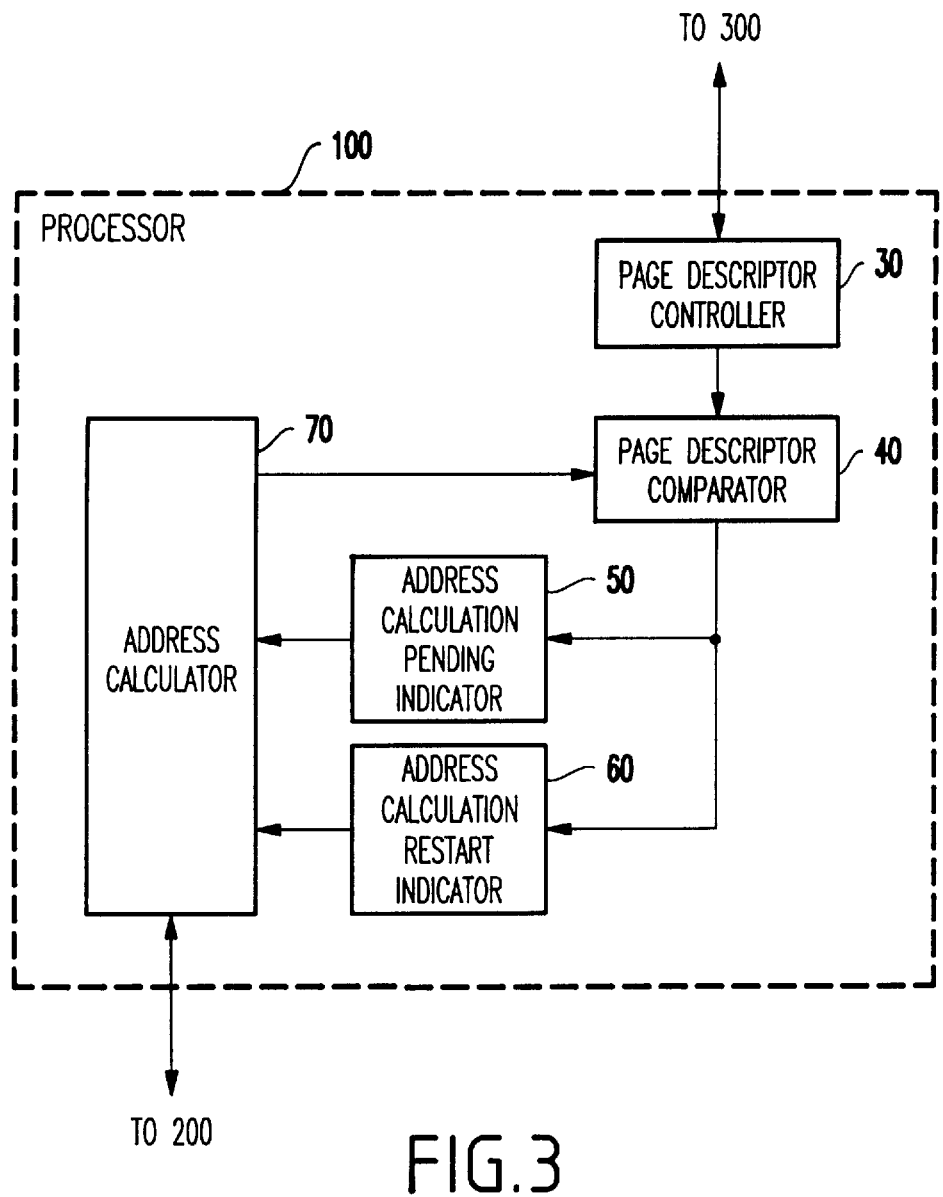
FIG. 3 is a block diagram showing the configuration of a processor 100 in the multi-processor system according to the first embodiment of the present invention.

Referring to FIG. 3, the processor 100 includes a page descriptor controller 30, a page descriptor comparator 40, an address calculation pending indicator 50, an address calculation restart indicator 60, and an address calculator 70. In FIG. 3, other elements of the processor 100 not directly pertinent to the present invention are omitted for clarity and brevity.

The page descriptor controller 30, coupled to the network 300, controls resetting (updating) of the page descriptors in the memory 200 coupled to its respective processor 100. The page descriptor controller 30 sends out an "ENTER RSTPD" message via the network 300 which notifies the other processors when the page descriptor is updated by its own (e.g., respective) processor 100. The "ENTER RSTPD" message indicates entry of a mode of resetting of a page descriptor.

Upon completion of the resetting operation, the page descriptor controller 30 issues an "EXIT RSTPD" message to the other processors 100 via the network 300, which indicates a completion of the updating operation in the respective processor 100.

The page descriptor controller 30 in each processor 100 sends out a "REPLY" message via the network 300 to a processor 100 which has sent out the "ENTER RSTPD" message.

The page descriptor comparator 40 compares a page descriptor referred to in the address calculation with a page descriptor to be updated, thereby detecting whether these page descriptors are coincident with each other.

The address calculation pending indicator 50 instructs the address calculator 70 to stop the address calculation when the page descriptor comparator 40 detects that the page descriptor referred to in the address calculation coincides with the page descriptor to be updated.

The address calculation restart indicator 60 instructs the address calculator 70 to restart the address calculation when the page descriptor comparator 40 detects completion of the updating of the page descriptor.

Figure 4:
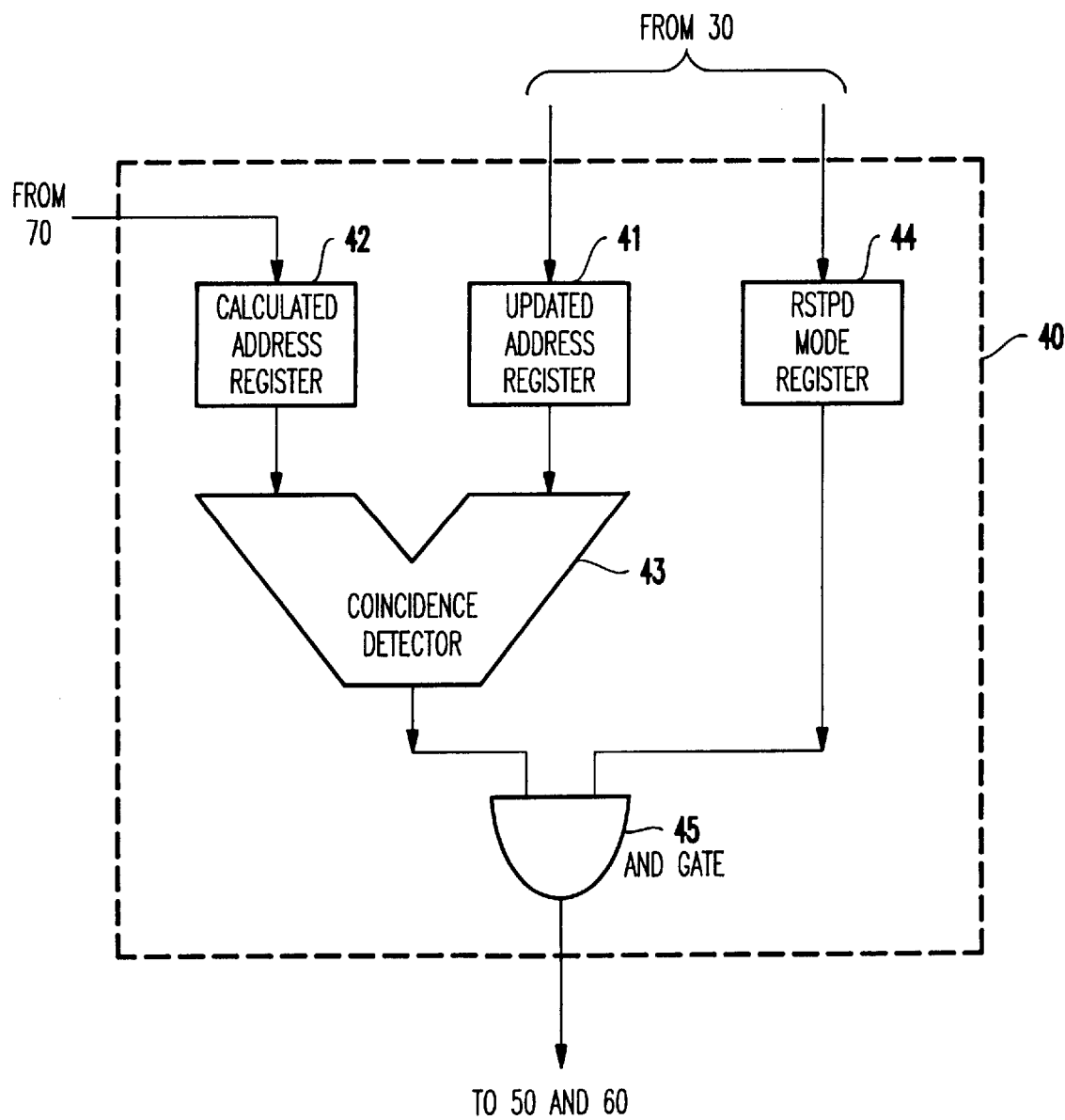
FIG. 4 is a block diagram showing the configuration of a page descriptor comparator 40 in the processor 100 according to the first embodiment of the present invention.

Referring to FIG. 4, the page descriptor comparator 40 comprises an updated address register 41, a calculated address register 42, a coincidence detector 43, an RSTPD mode register 44, and an AND gate 45.

The updated address register 41, coupled to the page descriptor controller 30, stores a physical page address included in a page descriptor to be updated. The updated address register 41 is set by the page descriptor controller 30 responding to an "ENTER RSTPD" message.

The calculated address register 42, coupled to the address calculator 70, stores a physical page address included in a page descriptor to be calculated for an address calculation. The calculated address register 42 is set by the address calculator 70 responding to an address calculation.

The coincidence detector 43 detects coincidence between the physical page address stored in the updated address register 41 and the physical page address stored in the calculated address register 42. When an output of the coincidence detector 43 indicates active (e.g., "1"), the physical page address stored in the updated address register 41 coincides with the physical page address stored in the calculated address register 42. When an output of the coincidence detector 43 indicates inactive (e.g., "0"), the physical page address stored in the updated address register 41 does not coincide with the physical page address stored in the calculated address register 42.

The RSTPD mode register 44, coupled to the page descriptor controller 30, stores a mode flag indicating whether the processor 100 is under an RSTPD mode. When the RSTPD mode register 44 indicates active (e.g., "1"), the page descriptor including the physical page address stored in the updated address register 41 is updated. When the RSTPD mode register 44 indicates inactive (e.g., "0"), the page descriptor including the physical page address stored in the updated address register 41 is not updated.

The AND gate 45 performs a logical AND operation between the output of the coincidence detector 43 and the output of the RSTPD mode register 44. Thus, when both the outputs of the coincidence detector 43 and the RSTPD mode register 44 are active, the page descriptor comparator 40 detects that the page descriptor referred to in the address calculation coincides with the page descriptor to be updated. Thereafter, when RSTPD mode register 44 becomes inactive (e.g., "0"), the page descriptor comparator 40 detects completion of the updating of the page descriptor.

The output of the page descriptor comparator 40 is sent to the address calculation pending indicator 50 and the address calculation restart indicator 60. The address calculation pending indicator 50 instructs the address calculator 70 to stop the address calculation when the output of the page descriptor comparator 40 indicates active. The address calculation restart indicator 60 instructs the address calculator 70 to restart the address calculation when the output of the page descriptor comparator 40 becomes inactive.

Hereinbelow and referring to FIGS. 3–8, the operation of the multi-processor system in accordance with the above-mentioned embodiment of the present invention will be described.

Referring to FIG. 5, upon receipt of the "ENTER RSTPD" message, the page descriptor controller 30 registers the page descriptor specified in the "ENTER RSTPD" message in the updated address register 41 of the page descriptor comparator 40 in step S301. Then, the RSTPD mode register 44 is set to active (e.g., "1") in step S302. The page descriptor controller 30 sends out the "REPLY" message to the processor which sent the "ENTER RSTPD" message, in step S303. Thereafter, the processor which has sent the "REPLY" message performs the normal operations in the RSTPD mode.

Referring to FIG. 6, upon receipt of the "EXIT RSTPD" message, the RSTPD mode register 44 is set to inactive (e.g., "0") in step S304. The page descriptor controller 30 sends out the "REPLY" message to the processor which sent the "EXIT RSTPD" message, in step S305.

Referring to FIG. 7, when the address calculator 70 calculates an effective address, a physical page address which is calculated in the address calculator 70 is registered in the calculated address register 42 in step S401. If the coincidence detector 43 detects coincidence between the physical page address stored in the updated address register 41 and the physical page address stored in the calculated address register 42 in step S402, then the RSTPD mode register 44 is checked in step S403.

If the RSTPD mode register 44 is active (e.g., "1") in step S403, then the address calculator 70 stops calculating until the RSTPD mode register 44 becomes inactive (e.g., "0").

If the coincidence detector 43 does not detect coincidence between the physical page address stored in the updated address register 41 and the physical page address stored in the calculated address register 42 in step S402, or if the RSTPD mode register 44 is inactive (e.g., "0") in step S403, then the address calculation is performed in step S404.

Figure 8:
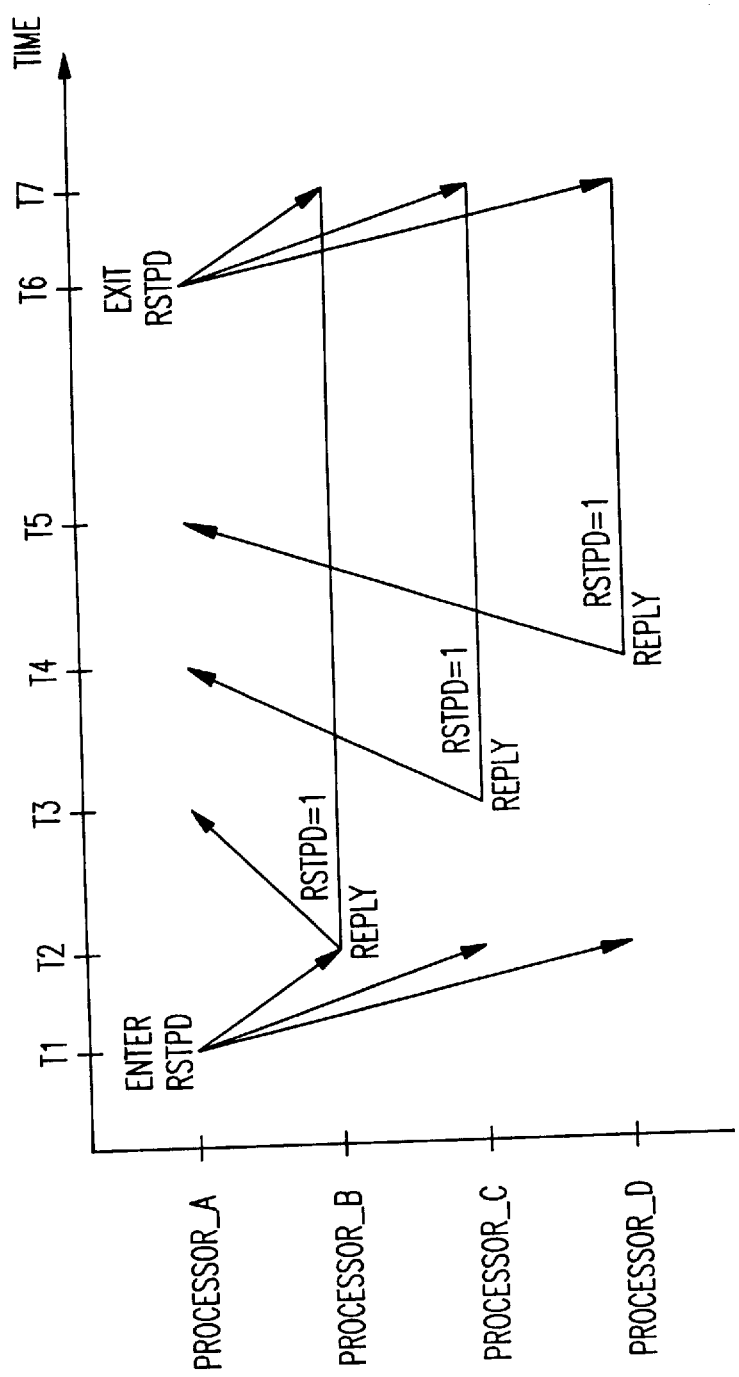
FIG. 8 is a timing chart showing a timing of resetting a page descriptor according to the first embodiment of the present invention.

Referring to FIG. 8, when the page descriptor is being updated in the processor__A, the processor__A sends out the "ENTER RSTPD" message to the remaining processor__B, processor__C, and processor__D in T1. The processors which have received the "ENTER RSTPD" message registers the updated page descriptor in their updated address register 41, and set the RSTPD mode register 44 to "1", thereby sending out the "REPLY" message to the processor__A. After the processor__A, processor__B, and processor__C send out the "REPLY" message in T2, T3, and T4, respectively, the processors are in the RSTPD mode until the processors receive the "EXIT RSTPD" message from the processor__A in T7.

Figure 9:
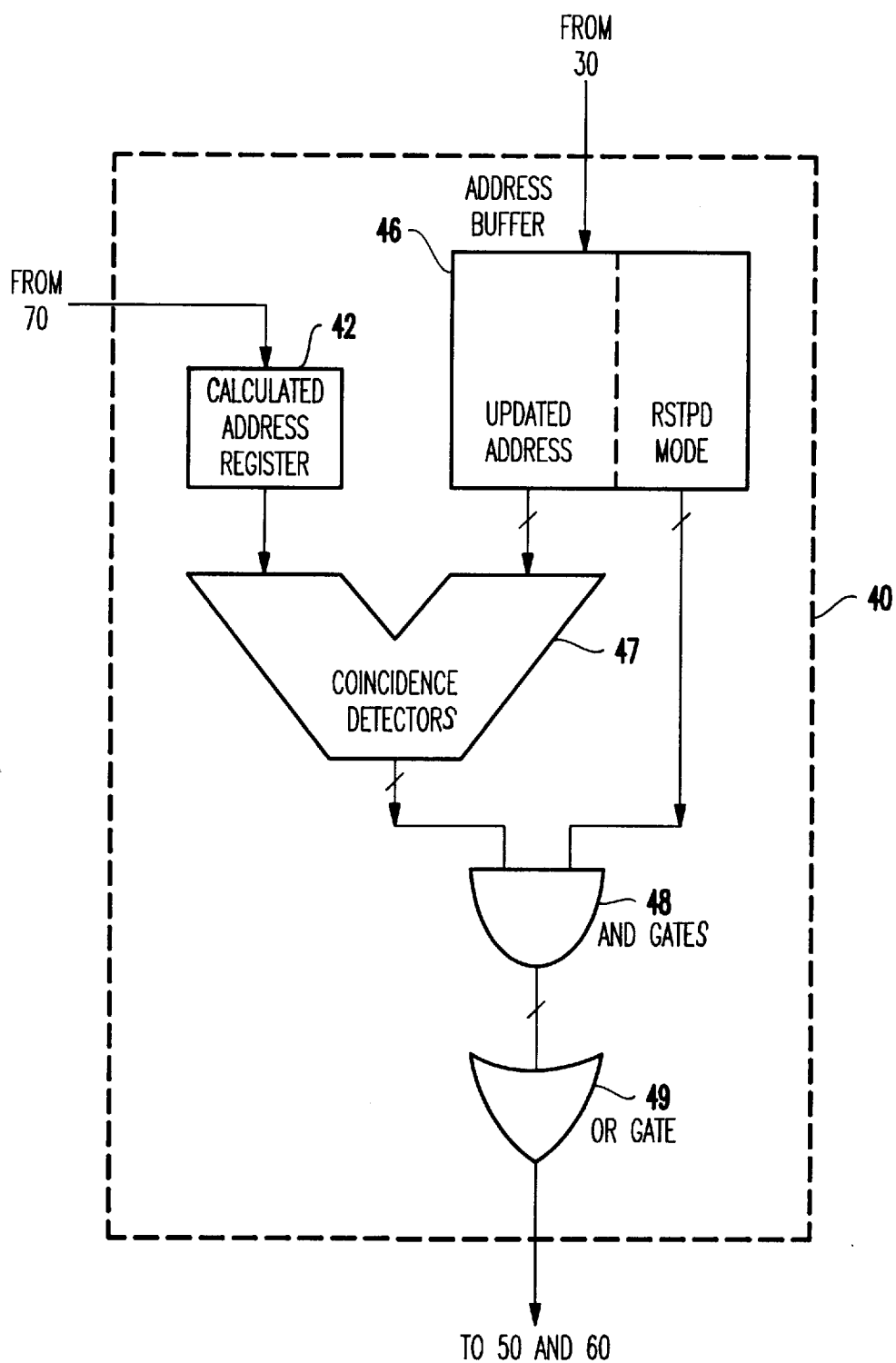
FIG. 9 is a block diagram showing the configuration of a page descriptor comparator 40 in the processor 100 according to a second embodiment of the present invention.

Referring to FIG. 9, the page descriptor comparator 40 according to a second embodiment of the present invention comprises a calculated address register 42, an address buffer 46, coincidence detectors 47, AND gates 48, and an OR gate 49. A difference between the first embodiment and the second embodiment is that the second embodiment has the address buffer 46, instead of the updated address register 41 and the RSTPD mode register 44 as in the first embodiment.

The address buffer 46 stores a plurality of updated addresses and corresponding RSTPD modes. Therefore, more than one page descriptor can be updated simultaneously.

The coincidence detectors 47 detect coincidence between the physical page address (updated address) stored in the address buffer 46 and the physical page address stored in the calculated address register 42.

The AND gates 48 perform logical AND operations between the outputs of the coincidence detectors 47 and the RSTPD modes of the address buffer 46.

The OR gate 49 performs a logical OR operation among the outputs of the AND gates 48. Thus, if at least one entry of the address buffer 46 coincides with the calculated address register 42, the address calculation is stopped.

As is apparent from the above description, according to the present invention, since the access to the page descriptor to be updated in a first processor of a multi-processor system can be blocked without interfering or affecting the operations of other processors of the multi-processor system, even when the page descriptor is being updated, the processing operations by the other processors, other than the access to the page descriptor to be updated, can be executed. Thus, the multi-processor system has increased performance as compared to the conventional system.

While the invention has been described in terms of several preferred embodiments, those skilled in the art will recognize that the invention can be practiced with modification within the spirit and scope of the appended claims.

What is claimed is:

1. A multi-processor system having a plurality of processors and a plurality of memories, each of said processors being coupled to a respective memory and comprising:

an address calculator for calculating a physical address of a position in a page of said respective memory;

a page descriptor comparator, coupled to said address calculator and to other processors of said multi-processor system, for comparing a first page descriptor with a second page descriptor; and an address calculation pending indicator for instructing said address calculator to stop a physical address calculation, when said page descriptor comparator detects coincidence between the first page descriptor and the second page descriptor such that an access with respect to a page descriptor other than the second page descriptor is performable during an updating process.

2. The multi-processor system according to claim 1, said first page descriptor comprising a page descriptor for the physical address calculation of said address calculator.

3. The multi-processor system according to claim 1, said first page descriptor including a physical page address for the physical address calculation of said address calculator.

4. The multi-processor system according to claim 2, said second page descriptor comprising a page descriptor being updated by a processor of said other processors of said multi-processor system.

5. The multi-processor system according to claim 2, said second page descriptor including a physical page address being updated by a processor of said other processors of said multi-processor system.

6. The multi-processor system according to claim 4, further comprising:

an address calculation restart indicator for instructing said address calculator to restart the physical address calculation, when said page descriptor comparator detects a completion of updating of the second page descriptor.

7. A multi-processor system having a plurality of processors and a plurality of memories, each of said processors being coupled to a respective memory and comprising:

an address calculator for calculating a physical address of a position in a page of said respective memory;

a first address storage, coupled to said address calculator, for storing a first page descriptor;

a second address storage, coupled to other processors of said multi-processor system, for storing a second page descriptor and an operation mode;

a page descriptor comparator for comparing the first page descriptor stored in said first address storage with the second page descriptor stored in said second address storage; and an address calculation pending indicator for instructing said address calculator to stop a physical address calculation, when said page descriptor comparator detects coincidence between the first page descriptor and the second page descriptor, and the operation mode stored in said second address storage such that an access with respect to a page descriptor other than the second page descriptor is performable during an updating process.

8. The multi-processor system according to claim 7, said first page descriptor comprising a page descriptor for the physical address calculation of said address calculator.

9. The multi-processor system according to claim 7, said first page descriptor including a physical page address for the physical address calculation of said address calculator.

10. The multi-processor system according to claim 8, said second page descriptor comprising a page descriptor being updated by a processor of said other processors of said multi-processor system.

11. The multi-processor system according to claim 8, said second page descriptor including a physical page address being updated by a processor of said other processors of said multi-processor system.

12. The multi-processor system according to claim 7, further comprising:

an address calculation restart indicator for instructing said address calculator to restart the physical address calculation, when said page descriptor comparator detects one of incoincidence between the first page descriptor and the second page descriptor, and the operation mode stored in said second address storage being inactive.

13. The multi-processor system according to claim 7, said first address storage comprising a first address register for storing the first page descriptor.

14. The multi-processor system according to claim 7, said second address storage comprising a second address register for storing the second page descriptor, and a mode register for storing the operation mode.

15. The multi-processor system according to claim 7, said second address storage comprising an address buffer which stores a plurality of second page descriptors, and a plurality of operation modes.

16. The multi-processor system according to claim 7, further comprising:

a page descriptor controller for controlling updating of the second page descriptor.

17. The multi-processor system according to claim 16, said page descriptor controller outputting a first message to notify the second page descriptor to said other processors of said plurality of processors and to enter an updating mode.

18. The multi-processor system according to claim 17, said page descriptor controller issuing a second message to said other processors of said plurality of processors to exit the updating mode.

19. A method of controlling an access to a page descriptor of a page in a memory of a multi-processor system having a plurality of processors and a plurality of memories respectively coupled to said plurality of processors, said method comprising steps of:

registering the page descriptor to be updated of a page in a memory coupled to a processor;

entering an updating mode by said processor;

updating the page descriptor by said processor; and exiting the updating mode by said processor, wherein an access with respect to a page descriptor other than the page descriptor being updated is performable during said updating step.

20. The method of controlling the access to the page descriptor according to claim 19, said method further comprising steps of:

registering a second page descriptor for a physical address calculation of a position of a page in said memory;

beginning said physical address calculation;

comparing the page descriptor with the second page descriptor;

delaying said physical address calculation until the processor exits from the updating mode if the page descriptor coincides with the second page descriptor; and completing said physical address calculation.

21. A processor, coupled to a memory, comprising:

an address calculator for calculating a physical address of a position in a page of said memory;

a first address storage, coupled to said address calculator, for storing a first page descriptor;

a second address storage, coupled to a second processor, for storing a second page descriptor and an operation mode;

a page descriptor comparator for comparing the first page descriptor stored in said first address storage with the second page descriptor stored in said second address storage; and an address calculation pending indicator for instructing said address calculator to stop a physical address calculation, when said page descriptor comparator detects coincidence between the first page descriptor and the second page descriptor, and the operation mode stored in said second address storage such that an access with respect to a page descriptor other than the second page descriptor is performable during an updating process.

22. The processor according to claim 21, wherein:

said first address storage comprises a first address register for storing the first page descriptor, and said second address storage comprises a second address register for storing the second page descriptor, and a mode register for storing the operation mode.

23. The processor according to claim 21, said second address storage comprising an address buffer which stores a plurality of second page descriptors, and a plurality of operation modes.

* * * * *